United States Patent Office 2,849,509
Patented Aug. 26, 1958

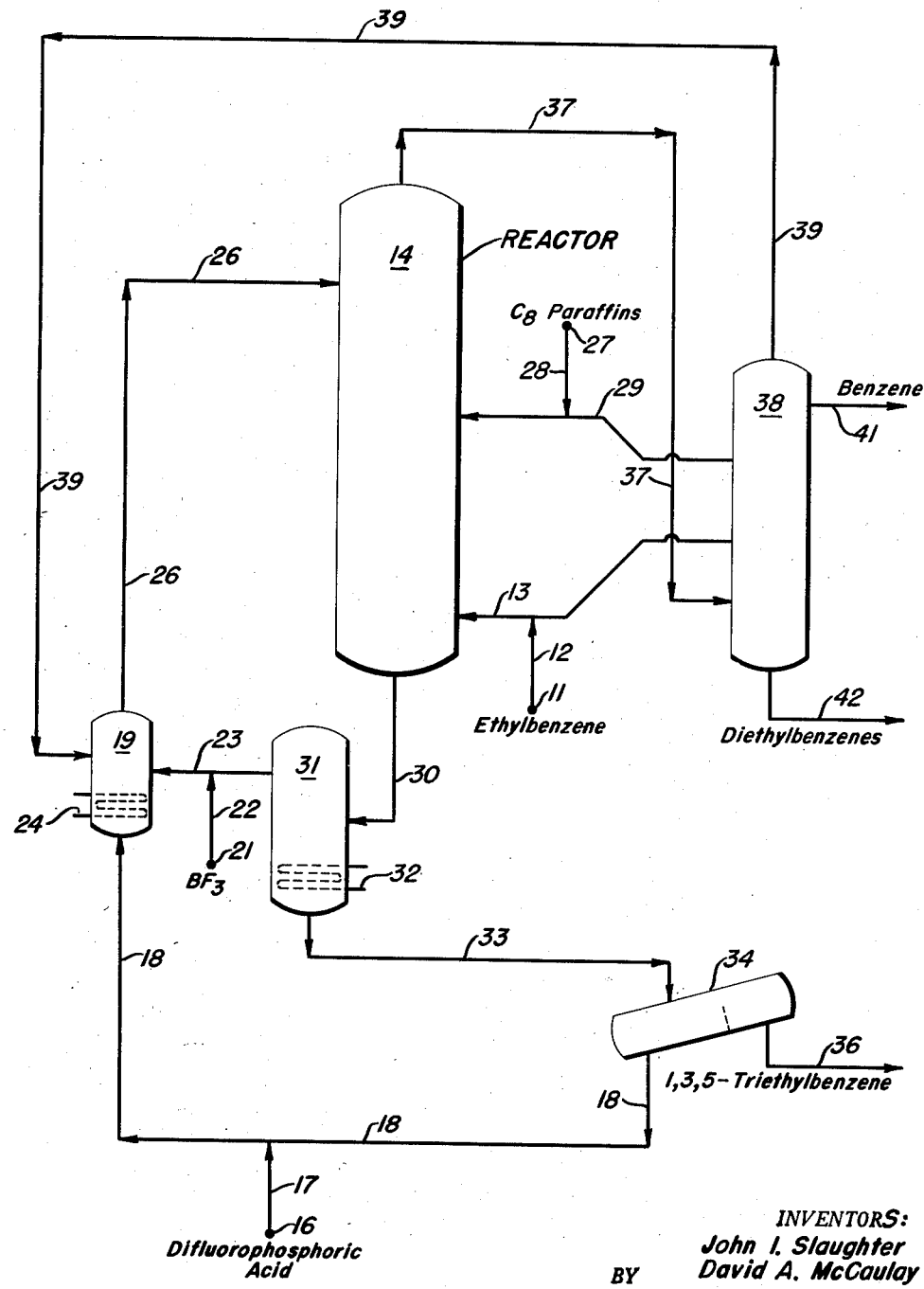

2,849,509

PROCESS FOR CONVERSION OF ALKYLBENZENES WITH A DIFLUOROPHOSPHORIC ACID-BF₃ CATALYST

John I. Slaughter, Beaver Dams, N. Y., and David A. McCaulay, Chicago, Ill., assignors to Standard Oil Company, Chicago, Ill., a corporation of Indiana Application December 20, 1955, Serial No. 554,461

13 Claims. (Cl. 260—668)

This invention relates to a process for the catalytic conversion of alkylated aromatic hydrocarbons, and in particular it concerns the catalytic conversion of alkylbenzenes.

Alkylbenzenes are used by the chemical industry as intermediates in the preparation of resins, plastics, and diverse chemicals such as aldehydes, alcohols, carboxylic acids, etc. Because the demand for alkylbenzenes, especially polyalkylbenzenes, i. e. having two or more alkyl substituents, has increased rapidly, a practical method for synthesizing them is urgently needed. The most desirable polyalkylbenzenes are those which have low molecular weight alkyl substituents. Such polyalkylbenzenes are more easily transformed by dehydrogenation, oxidation, or other means to the end chemical desired, than are those which have a high molecular weight alkyl substituent. Specific isomers of polyalkylbenzenes are in special demand. Examples of various polyalkylbenzenes which are needed in the chemical and related industries are: metaxylene, mesitylene, 1,3-diethylbenzene, 1,3,5-triethylbenzene, 1,3,5-ethylxylene, 1,3,5-triisopropylbenzene, and similar materials.

An object of this invention is to provide a process for the catalytic conversion of alkylbenzenes having low molecular weight alkyl substituents attached to the benzene nucleus. Another object is to provide a novel catalyst system which can be employed in effecting the separation and recovery of the converted polyalkylbenzenes. A further object of the invention is to provide a method and means for catalytically converting by a process such as disproportionation, isomerization, and interaction, monoalkylbenzenes and polyalkylbenzenes into polyalkylbenzenes containing a substantial amount of benzenes substituted in the 1,3 or 1,3,5 positions with the low molecular weight alkyl substituents. Other objects and advantages of the invention will be apparent from the detailed description thereof.

It has been found that alkylbenzenes, of a type to be defined hereinafter, can be catalytically converted by contacting with difluorophosphoric acid in the presence of $BF_3$. A number of reactions of the alkylbenzene molecule can be effected. The alkyl substituents may be shifted along the benzene ring, i. e. isomerization, or the alkyl substituent may be shifted from one alkylbenzene molecule to another, i. e. disproportionation or interaction of alkylbenzenes. The alkylbenzenes which may thus be converted are those having between 1 and 4 carbon atoms inclusive, in the alkyl side chain and which have a sum total of at least two carbon atoms in the side chain(s) of the alkylbenzene molecule. At least one volume of difluorophosphoric acid per volume of alkylbenzene must be used, and generally the amount is not more than ten volumes of acid per volume of feed alkylbenzene for economic reasons. A partial pressure of $BF_3$ of between about 100 and 5000 p. s. i. g. must be maintained during the course of the conversion of the alkylbenzenes. A temperature between 0° and 300° F. and a reaction time between about twenty hours and one minute may be used. The longer reaction times are generally needed with lower reaction temperatures. After the alkylbenzenes have been catalytically converted they can be recovered by removing $BF_3$ from contact with the hydrocarbons and acid and then separating a heavier acid phase from a lighter hydrocarbon phase. The converted alkylbenzenes are then recovered from the hydrocarbon phase.

In accordance with a preferred embodiment of our invention a product fraction can be recovered which is enriched in converted alkylbenzenes which contain alkyl substituents in the 1,3 or 1,3,5 positions in the benzene ring. This preferred embodiment utilizes the peculiar selective solvent properties of difluorophosphoric acid and $BF_3$ when the latter is employed under a partial pressure usually of about at least 100 p. s. i. g. In our preferred embodiment, after conversion has been effected any hydrocarbons which form a separate raffinate phase distinct from an extract phase are removed from the reaction system. This separation is effected prior to removing $BF_3$ from the reaction system. The remaining extract phase consists of the acid containing dissolved hydrocarbons (these dissolved hydrocarbons are rich in converted alkylbenzenes substituted in the 1,3 and 1,3,5 positions in the benzene ring). After removing $BF_3$ from the extract phase, these dissolved hydrocarbons are sprung from solution and form a separate hydrocarbon phase which is then recovered.

Suitable feed stocks to our catalytic conversion process are those alkylbenzenes which contain between 1 and 4 carbon atoms, inclusive in their alkyl side chain(s). The alkyl side chain or side chains contained in the alkylbenzene molecule must have a total of at least 2 carbon atoms in order to be catalytically converted by our process. The alkylbenzenes may contain between 1 and 5 alkyl substituents per alkylbenzene molecule.

The alkylbenzenes may undergo a variety of reactions. They may be isomerized, by shifting of the alkyl substituents to different positions on the benzene nucleus; they may be disproportionated, for example ethylbenzene can be disproportionated to diethylbenzene and triethylbenzene; or interactions of different alkylbenzenes can be effected, for example ethylbenzene and meta-xylene will interact to produce 1,3,5-ethylxylene and benzene.

It is apparent that a wide variety of alkylbenzenes may be used as feed stocks in our process, depending upon the product desired, and the chemical reactions involved. Examples of suitable alkylbenzene feed stocks to our process are xylenes, trimethylbenzenes, tetramethylbenzenes, ethylbenzene, diethylbenzenes, triethylbenzenes, tetraethylbenzenes, ethyltoluenes, ethylxylenes, ethyl trimethylbenzenes, isopropylbenzene, diisopropylbenzenes, triisopropylbenzenes, isopropyl toluenes, isopropyl xylenes, n-propylbenzene, di-n-propylbenzenes, tertiary butylbenzene, di-tertiary-butylbenzenes, as well as the isomers and mixtures of the above listed compounds, and other alkylbenzenes having between 1 and 4 carbon atoms in the alkyl side chain(s) and which have at least a total of 2 carbon atoms in the alkyl substituent attached to the alkylbenzene molecule. It is not essential that compounds such as were listed supra be employed individually and in a highly purified state. For example hydrocarbon fractions containing a substantial amount of the defined alkylbenzenes, such as petroleum fractions, hydrocarbons obtained from the coking of coal, and the like may be used. These fractions should not contain reactive hydrocarbons such as olefins and diolefins which might enter into other complicated reactions. Non-reactive hydrocarbons such as paraffinic hydrocarbons may be present in the feed without adverse effect on the catalytic conversion process.

In effecting the catalytic conversion of alkylbenzenes it is essential that at least one volume of difluorophosphoric acid per volume of alkylbenzene be employed. Larger amounts may be used, and indeed it is preferred to employ about three volumes of difluorophosphoric acid per volume of the alkylbenzenes which are employed as feed. Generally not more than about ten volumes of the acid per volume of feed alkylbenzene is used for economic reasons. When less than about one volume of difluorophosphoric acid per volume of feed alkylbenzene is used, there is very little conversion of the alkylbenzenes. The extent of conversion of the alkylbenzenes is not substantially increased when more than about three volumes of difluorophosphoric acid per volume of the feed alkylbenzenes are employed.

In order to obtain the catalytic conversion of alkylbenzenes it is essential that a $BF_3$ partial pressure of at least 100 p. s. i. g. be maintained in the course of the reaction. It is preferred to employ a $BF_3$ partial pressure of between about 500 and 2000 p. s. i. g. In general the extent of conversion of the alkylbenzenes increases with an increasing partial pressure of $BF_3$ in the reaction zone. While $BF_3$ partial pressures of 5000 p. s. i. g may be used, it is usually not economical to employ higher $BF_3$ partial pressures since the increase in the extent of conversion may not be justifiable economically in view of much greater equipment costs.

In the conversion of the alkylbenzenes an operating temperature of between about 0° and 300° F. may be used. When temperatures of about 350° F. or higher are used cracking of the hydrocarbons occurs. At temperatures much lower than about 0° F. the rate of conversion is undesirably low. Usually a temperature between about 50° and 150° to 200° F. is satisfactory. The conversion of the alkylbenzenes may be allowed to proceed until substantially equilibrium conditions are achieved, or the reaction may be terminated before such time. Thus a contact time of between about one minute and twenty hours may be used. In general the longer contact times are employed when using the lower operating temperatures and the shorter contact times are used when employing the higher operating temperatures. Suitable reaction times are usually from about five minutes to five hours.

It must, of course, be remembered that the reaction rate will depend upon the intensity of mixing of the alkylbenzenes with the difluorophosphoric acid and $BF_3$. In general poorer mixing efficiency will necessitate a longer contact time.

The operating temperature which is selected will be governed partially by the alkylbenzene which is being reacted. Branched chain alkyl substituents attached to the benzene ring are more mobile than straight chain substituents. Isopropyl, secondary butyl, and tertiary butyl side chains are highly mobile at about 50° F. At temperatures of about 75° F. ethyl side chains are highly mobile. Temperatures of about 125° F. are needed to render the methyl side chains highly mobile. Thus in selecting the operating temperature for the isomerization, disproportionation, or interaction of alkylbenzenes, consideration must be given to the size and structure of the alkyl substituent attached to the benzene nucleus.

Our catalyst system has selective solvent properties. It is believed that it functions as a selective solvent because of certain complex formations which will be hereinafter described. $BF_3$ is readily absorbed when passed into difluorophosphoric acid. When exposed to a partial pressure of $BF_3$ of 5 p. s. i. g. or higher, the acid becomes saturated with $BF_3$. A coordination compound appears to form between two moles of difluorophosphoric acid and one mole of $BF_3$. If additional $BF_3$ is present (a contact zone is operated under a partial pressure of $BF_3$ of e. g. 100 p. s. i. g. or higher) the polyalkylbenzenes, especially those containing alkyl substituents substituted in the 1,3 or 1,3,5 positions in the benzene ring, become complexed with the difluorophosphoric acid and $BF_3$. Thus the coordination compound consisting of two moles of difluorophosphoric acid with one mole of $BF_3$ appears to complex with one mole of an extractable polyalkylbenzene and an additional mole of $BF_3$ in the following fashion.

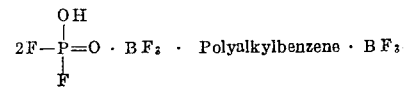

The complexes which are formed between the difluorophosphoric acid, $BF_3$, and various polyalkylbenzenes have varying degrees of stability dependent upon the polyalkylbenzene and the partial pressure of $BF_3$ on the system. In general polyalkylbenzenes form more stable complexes when they contain a greater number of alkyl substituents in the benzene ring. Those alkylbenzenes which are substituted in the 1,3 and 1,3,5 position form complexes which are more stable than those formed from polyalkylbenzenes having the same number of alkyl substituents but which are substituted in different positions in the benzene ring. The stability of the complex of a polyalkylbenzene with difluorophosphoric acid and $BF_3$ is reflected by the pressure at which it dissociates. The higher the $BF_3$ pressure necessary to prevent dissociation, the less stable is the complex. By taking advantage of the differing stabilities of the complexes of various polyalkylbenzenes with difluorophosphoric acid at varying $BF_3$ partial pressures, a number of separations between different polyalkylbenzenes can be effected. The use of difluorophosphoric acid and $BF_3$, generally in a partial pressure in excess of 100 p. s. i. g., as a selective solvent is described and claimed in our Serial No. 504,206, filed April 27, 1955, now U. S. Patent No. 2,762,751, of which this is a continuation in part.

During the catalytic conversion of the alkylbenzenes a liquid phase and a gaseous phase will be present in the reaction zone. Generally the liquid phase will be a heterogeneous mixture of hydrocarbons and difluorophosphoric acid, the more soluble polyalkylbenzenes (those which have become complexed with the difluorophosphoric acid and $BF_3$) being dissolved in the difluorophosphoric acid. Intimate mixing of the alkylbenzenes, difluorophosphoric acid, and $BF_3$ is effected during the course of the reaction.

After carrying out the conversion for the desired length of time, the reaction products can then be recovered. Converted alkylbenzenes can be recovered by reducing the partial pressure of $BF_3$ which is in contact with the hydrocarbons and difluorophosphoric acid. As the $BF_3$ partial pressure is reduced, the less stable complexes formed between difluorophosphoric acid, $BF_3$, and the polyalkylbenzene are dissociated. The polyalkylbenzenes are thus sprung from solution in the acid phase and pass into a hydrocarbon phase. Stratification of the hydrocarbon and acid phases can be effected and the two phases separated. The converted alkylbenzene can then be recovered from the hydrocarbon phase. It is apparent that the $BF_3$ partial pressure may be partially reduced and the quantity of sprung hydrocarbons regulated to achieve a solvent extraction effect. This may be carried out by separating the sprung hydrocarbons from the acid phase and then reducing the $BF_3$ partial pressure existent in the acid phase. When the $BF_3$ partial pressure is reduced again, a further amount of hydrocarbons are sprung from the acid phase. These hydrocarbons will have a higher concentration of the more highly substituted alkylbenzenes and especially those which are substituted in the benzene ring in the 1,3 and/or 1,3,5 positions. The $BF_3$ partial pressure may be reduced in as many stages as is desirable, thus producing sprung hydrocarbons in the course of each stage of BF₃ partial pressure reduction. Or the BF₃ partial pressure can be reduced to atmospheric in one stage if desired. This will spring substantially all of the hydrocarbons contained in the acid phase.

Because our catalyst system has selective solvent properties, a heterogeneous mixture of liquids is present in the reactor during the conversion of the alkylbenzenes. A preferred method of recovering the converted alkylbenzenes consists of separating the two liquid phases which are present after the conversion of the alkylbenzenes. These two liquid phases will be termed herein as the raffinate phase (which contains BF₃ and non-complexed hydrocarbons) and the extract phase (which contains difluorophosphoric acid, BF₃, complexed and some physically dissolved hydrocarbons). The separation of the extract phase from the acid phase before removing any substantial amount of BF₃ from the extract phase provides a means for extracting the converted alkylbenzenes which contain alkyl substituents in the 1,3 and 1,3,5 positions in the benzene ring, especially the latter compounds. The BF₃ partial pressure existent in the separated extract phase may then be partially or fully reduced i. e. reduced to atmospheric pressure. This springs hydrocarbons having a very high concentration of polyalkylbenzenes containing alkyl substituents in the 1,3 and 1,3,5 positions, as has previously been described.

The invention will be more fully understood by reference to the following example illustrated in the annexed drawing which forms a part of this specification and shows in schematic form one embodiment of the process of this invention for catalytically converting ethylbenzene to predominantly 1,3,5 triethylbenzene.

Ethylbenzene is passed from source 11 by way of line 12 into line 13 where it meets additional quantities of recovered and recycled ethylbenzene. It is then passed by way of line 13 into reactor 14 at a point near the bottom of the reactor. Difluorophosphoric acid from source 16 is passed by way of line 17 into line 18 where it meets with additional quantities of recovered and recycled difluorophosphoric acid. It is then passed by way of line 18 into vessel 19. BF₃ from source 21 is passed by line 22 and then into line 23 where it meets additional quantities of recovered BF₃. BF₃ is then passed by way of line 23 into vessel 19. The catalyst is prepared in vessel 19 by introducing BF₃ into difluorophosphoric acid until a partial pressure of BF₃ of about 1000 p. s. i. g. is attained. Vessel 19 is provided with cooling means 24 to remove the heat formed during the saturation of the acid with BF₃.

The catalyst, which consists of difluorophosphoric acid maintained under a BF₃ partial pressure of about 1000 p. s. i. g., is passed from vessel 19 by way of line 26 into reactor 14 at a point near the top of the reactor. The catalyst travels downwardly in reactor 14 and the ethylbenzene travels countercurrently therethrough. A temperature of about 100° F. is maintained within the reactor. A partial pressure of BF₃ of about 1000 p. s. i. g. is maintained within reactor 14. The catalyst and ethylbenzene feed stock are introduced at rates so that approximately three volumes of difluorophosphoric acid are employed per volume of ethylbenzene feed stock. The catalyst and ethylbenzene are introduced at a rate such that a contact time of approximately one hour is used. In reactor 14, which is well agitated by means not shown, the ethylbenzene is disproportionated to diethyl- and triethylbenzene, predominantly the latter. The triethylbenzene is almost exclusively 1,3,5 triethylbenzene. A raffinate phase containing BF₃ and hydrocarbons not dissolved by the extract phase is removed from the top of reactor 14. The heavier extract phase containing BF₃, difluorophosphoric acid, and complexed alkylbenzenes is removed from the bottom of reactor 14. To achieve a sharper separation during the course of the extraction, C₈ paraffins, or some other inert hydrocarbons, are introduced into reactor 14 at a point intermediate of the introduction of the catalyst and the feed stock. The C₈ paraffins wash out occluded and physically dissolved alkylbenzenes from the extract phase. In this embodiment the C₈ paraffins are introduced from source 27 by way of line 28 into line 29 where they meet further amounts of recovered and recycled C₈ paraffins. The paraffins are then passed by way of line 29 into reactor 14.

The extract phase is removed from the bottom of reactor 14 and passed by way of line 30, while still under the partial pressure of BF₃ of approximately 1000 p. s. i. g., into extract decomposer 31. BF₃ is flashed from the extract phase by reducing the pressure on the extract phase to atmospheric pressure. Extract decomposer 31 is provided with a heating means 32 which maintains a temperature within the decomposer of about 100° F. The flashed BF₃ is removed by way of line 23 and thence passed into vessel 19 for the preparation of further amounts of catalyst. The liquid remaining in vessel 31 is substantially all difluorophosphoric acid and 1,3,5 triethylbenzene. It is passed from extract decomposer 31 by way of line 33 into settler 34 wherein a heavier difluorophosphoric acid layer is separated from a lighter layer of 1,3,5 triethylbenzene. The difluorophosphoric acid layer is removed from settler 34 and passed by way of line 18 into vessel 19 where it is used to prepare additional quantities of catalyst. Upon repeated reaction the difluorophosphoric acid becomes somewhat contaminated with a tarry material. When the acid requires it may be purified by distillation at a temperature of about 175° F. under a slight vacuum. The purified acid may then be sent to vessel 19 and the tarry material discarded. The lighter hydrocarbon layer is removed from settler 34 and passed by way of line 36 to storage, not shown. This hydrocarbon layer consists almost exclusively of 1,3,5 triethylbenzene with minor amounts of other polyalkylbenzenes and BF₃ and dissolved acid. Further purification such as caustic washing, coalescing and distillation, may be used to prepare an extremely pure 1,3,5 triethylbenzene fraction.

The raffinate phase is removed overhead from reactor 14 and passed by way of line 37 into fractionating tower 38. In fractionator 38 BF₃ is removed overhead and passed by way of line 39 into vessel 19 wherein it is employed to form additional amounts of catalyst. A side stream consisting of the C₈ paraffins is removed from fractionator 38 and passed by way of line 29 into reactor 14. Unconverted ethylbenzene is removed as a side stream from fractionator 38 and recycled by way of line 13 into reactor 14 for further conversion. A benzene stream is removed as a side cut from fractionator 38 by way of line 41 and passed to storage and/or further purification, not shown. A bottoms fraction which consists primarily of diethylbenzenes is removed from fractionator 38 by way of line 42 and passed to storage and/or purification means not shown herein.

A number of experiments were performed which demonstrate the effectiveness of our invention. The procedure which was followed in the experiments was as follows: the feed alkylbenzene was charged to an autoclave reactor provided with internal agitation means. Difluorophosphoric acid was then added to the autoclave in the desired amount. The autoclave was sealed and BF₃ introduced until the desired partial pressure of BF₃ was attained within the autoclave. The contents were then mixed for the desired length of time. After the desired reaction period had elapsed, BF₃ was removed and the contents of the autoclave were passed into a vessel filled with crushed ice which had been brought to the temperature of a Dry Ice-acetone bath. The hydrocarbons separated as an upper oil layer above a lower aqueous acid layer. The oil layer was withdrawn, neutralized with aqueous ammonia and water washed. The washed hydrocarbons were fractionated in a column providing about thirty theoretical plates. Fractions from the distillation were analyzed by ultraviolet and infra-red spectrometry as well as by physical characteristics (any deviations from the above procedure in individual experiments will be described at the appropriate place).

The first series of runs illustrate the great importance of employing at least one volume of difluorophosphoric acid per volume of feed alkylbenzene in catalyzing the conversion of the alkylbenzenes. This series of runs also shows the great importance of maintaining a partial pressure of $BF_3$ of at least 100 p. s. i. g. in the reaction zone. In the runs ethylbenzene was disproportionated to diethylbenzene and triethylbenzene. An operating temperature of about 75° F. was used. The reaction time was approximately 30 minutes. In the runs which were carried out the volumetric ratio of difluorophosphoric acid to feed alkylbenzene varied between 0.1 and 6.0 volumes of acid/volume of feed alkylbenzene. The partial pressure of $BF_3$ in the reaction zone was also varied between 100 p. s. i. g. and 5000 p. s. i. g. The percentage of conversion of the ethylbenzene feed stock into other products such as diethylbenzene and triethylbenzene were measured and the results are shown in Table I which follows:

TABLE I

*Percent conversion of alkylbenzenes—as function of $HPO_2F_2$/feed ratio and $BF_3$ partial pressure*

| Vol. $HPO_2F_2$/vol. feed: | $BF_3$ partial pressure (p. s. i. g.) | | | | | |
|---|---|---|---|---|---|---|
| | 100 | 500 | 1,000 | 1,400 | 2,000 | 5,000 |
| 0.1 | 0 | 0 | 3 | | | |
| 0.25 | | 1.6 | | | | |
| 1.0 | | 24 | | | | |
| 2.0 | | 28 | | | | |
| 3.0 | 6 | 41 | | 68 | 67 | 75 |
| 6.0 | | 45 | | | | |

It is apparent from an observation of the runs performed wherein the volumetric ratio of acid to feed alkylbenzene was less than 1.0, that the extent of conversion of the feed alkylbenzene was so low as to be only indicative that a reaction was occurring. Of the runs shown under such conditions 3% conversion of the ethylbenzene was the maximum obtained when a volumetric ratio of acid to feed alkylbenzene of less than 1.0 was used. However, when the volumetric ratio of difluorophosphoric acid to feed alkylbenzene was 1.0 or higher, the percentage conversion greatly increased to 25% and higher. At a volumetric ratio of acid to feed alkylbenzene of about 3.0 the percentage conversion increased to 41%. The rate of increase in the percentage conversion slowed down as larger ratios of acid to feed alkylbenzene were employed. Thus about three volumes of feed alkylbenzene is a very satisfactory ratio to use. The results above also indicate that if the $BF_3$ partial pressure were reduced below 100 p. s. i. g., the extent of conversion of the feed alkylbenzene would be almost undetectable. At a $BF_3$ partial pressure of 100 p. s. i. g. (and a volumetric ratio of acid to feed alkylbenzene of 3.0) the extent of conversion begins to increase, until at a $BF_3$ partial pressure of 500 p. s. i. g., conversions of the order of 25 to 45% are attained. Obviously if $BF_3$ were not maintained in the reaction zone in a partial pressure higher than atmospheric, there would be essentially no conversion of the feed alkylbenzene. It will also be noticed from Table I that if the partial pressure of $BF_3$ is increased in the reaction zone above 500 p. s. i. g., the extent of conversion continues to increase. However, the increase in the extent of converssion seems to slow down at $BF_3$ partial pressures higher than about 1500 to 2000 p. s. i. g. It is evident from the above table that in order to catalytically convert alkylbenzenes it is essential to employ at least one volume of difluorophosphoric acid per volume of feed alkylbenzene and maintain a $BF_3$ partial pressure in the reactor of at least 100 p. s. i. g., preferably between about 500 and 2000 p. s. i. g. or thereabouts.

The effect of contact time on the percentage conversion of alkylbenzene and the product distribution obtained was determined by conducting a series of runs performed at the same temperature but using a different contact time. In these runs an operating temperature of 75° F., a volumetric ratio of difluorophosphoric acid to feed ethylbenzene of 3.0, and a $BF_3$ partial pressure of about 1400 p. s. i. g. were employed. The runs were performed at contact times of 20, 60, and 120 minutes. The results are shown in Table II which follows:

TABLE II

*Effect of contact time on conversion of ethylbenzene*

| | Time (minutes) | | |
|---|---|---|---|
| | 20 | 60 | 120 |
| Percent conversion | 70 | 80 | 91 |
| Product distribution (weight percent): | | | |
| Benzene | 5 | 6 | 10 |
| Ethylbenzene | 30 | 20 | 9 |
| 1,2-diethylbenzene | | | |
| 1,3-diethylbenzene | 45 | 15 | 3 |
| 1,4-diethylbenzene | 2 | 1 | |
| 1,2,3-triethylbenzene | | 1 | 5 |
| 1,2,4-triethylbenzene | | | |
| 1,3,5-triethylbenzene | 21 | 56 | 72 |
| Ratio, 1,3,5-triethylbenzene/diethylbenzenes | 0.45 | 3.5 | 24.0 |

The data represented in Table II show that with a greater reaction time, at a given temperature, the percentage of conversion increases. The longer reaction times allow the product distribution to approach more closely the equilibrium distribution. In the runs shown in Table II it should be noted that with increasing the reaction time, the disproportionation products contained an increasing amount of triethylbenzenes. The ratio of 1,3,5-triethylbenzene to diethylbenzenes is shown for the different runs. This ratio increases from 0.45 to 24.0 parts of 1,3,5-triethylbenzene per part of diethylbenzene by weight when the contact time is increased from twenty minutes to 120 minutes, other conditions being equal. In general, the preferred conditions for disproportionating ethylbenzene are a temperature of between about 50° and 150° F., a $BF_3$ partial pressure between about 500 and 5000 p. s. i. g., and a contact time between about 5 minutes and 5 hours.

An additional series of experiments were performed illustrating the ability of our catalyst to isomerize polyalkylbenzenes. In the runs performed feed stocks consisting of 1,2,4-trimethylbenzenes (98% purity), orthoxylene, and mixed triethylbenzenes were used. A volumetric ratio of difluorophosphoric acid to the feed alkylbenzene of 3.0 was employed in all of the runs. Varying temperatures, reaction times, and $BF_3$ partial pressures in the autoclave were used. The conditions for effecting isomerization of the polyalkylbenzene as well as the distribution of products obtained is shown in Table III which follows:

TABLE III

*Isomerization of polyalkylbenzenes, conditions*

| Run No. | Feed | Partial pressure $BF_3$, p. s. i. g. | Temp., ° F. | Reaction time, minutes |
|---|---|---|---|---|
| 16 | 1,2,4-trimethylbenzene [1] | 1,400 | 75 | 60 |
| 17 | do.[1] | 2,000 | 75 | 1,200 |
| 18 | do.[1] | 1,400 | 150 | 30 |
| 19 | o-Xylene | 5,000 | 75 | 30 |
| 20 | Mixed triethylbenzenes | 500 | 75 | 360 |

[1] Purity of 98%.

*Isomerization of polyalkylbenzenes, results product distribution, weight percent*

| Run No. | Mono-alkyl | Dialkyl- | | | Trialkyl- | | | Tetral-kyl- |
|---|---|---|---|---|---|---|---|---|
| | | 1,2- | 1,3- | 1,4- | 1,2,3- | 1,2,4- | 1,3,5- | |
| 16 | 1.7 | 4.8 | 4.8 | 4.8 | | 81.3 | 7.0 | 4.5 |
| 17 | Trace | 0.6 | 3.5 | 0.6 | 9.0 | 27.0 | 55.0 | 4.7 |
| 18 | 1.1 | 5.5 | 11.0 | 2.8 | | 8.2 | 36.0 | 28.0 |
| 19 | 14.0 | 10.8 | 68.7 | 5.0 | | | 0.9 | 0.6 |
| 20 | | 3.2 | 3.2 | 3.2 | | | 94 | 3.2 |

It will be noted from the runs in Table III that disproportionation of the polyalkylbenzene occurs together with isomerization. It appears that the lower operating temperatures and longer contact times favor isomerization in preference to disproportionation of the polyalkylbenzenes. This can be noted by comparison of the conversion conditions and product distributions obtained in runs 17 and 18. The very high $BF_3$ pressures viz. of the order of 2000 to 5000 p. s. i. g. are also believed to minimize the disproportionation of polyalkylbenzenes. This may be noted from run 19 wherein only 1.5% of the orthoxylene was disproportionated to tri- or tetramethylbenzenes. Run 20 indicates that triethylbenzenes are easier to isomerize than are the trimethylbenzenes. For isomerizing trimethylbenzenes to 1,3,5-trimethylbenzene, a temperature of 50° to 150° F., a $BF_3$ partial pressure of 500 to 5000 p. s. i. g., and a contact time of 1 to 20 hrs. may be used.

The effectiveness of our catalyst for catalyzing the interaction of different alkylbenzenes, with transfer of an alkyl substituent from one alkylbenzene to a different alkylbenzene was demonstrated by a series of experiments. In the runs performed meta-xylene and ethylbenzene were reacted to produce 1,3,5-ethylxylene and benzene. Three selected examples follow:

*Run 21.*—Equal portions of ethylbenzene and meta-xylene were contacted with three volumes of difluorophosphoric acid per volume of the alkylbenzene mixture. An operating temperature of 95° F., a $BF_3$ partial pressure of 1425 p. s. i. g., and a reaction time of 60 minutes were employed. About 69 mole percent of the feed alkylbenzenes were converted. The distribution of the products was as follows:

PRODUCT DISTRIBUTION

| | Percent |
|---|---|
| Benzene | 30.5 |
| Ethylbenzene | 15.2 |
| m-Xylene | 15.2 |
| $C_{10}$ aromatics | 39.0 |
|    1,3,5-ethylxylene | 97 |

*Run 22.*—Essentially the same feed composition and operating conditions were employed in this run as were used in run 21 except that an operating temperature of 200° F. and a contact time of 30 minutes were used. The extent of conversion was 51 mole percent. The product distribution was as follows:

PRODUCT DISTRIBUTION

| | Percent |
|---|---|
| Benzene | 20.5 |
| Ethylbenzene | 24.3 |
| m-Xylene | 24.3 |
| $C_{10}$ aromatics | 30.8 |
|    1,3,5-ethylxylene | 85 |
|    1,3-diethylbenzene | 10 |
|    1,4-diethylbenzene | 3 |

*Run 23.*—In run 23 the feed alkylbenzene mixture was a fraction obtained by extracting a $C_8$ hydrocarbon fraction obtained from hydroforming a virgin naphtha. The feed alkylbenzene mixture had a composition in mole percent of 28% ethylbenzene, 18% o-xylene, 39% m-xylene, and 15% p-xylene. The volumetric ratio of difluorophosphoric acid to feed alkylbenzenes used was 2.0. An operating temperature of 75° F. and a $BF_3$ partial pressure of 500 p. s. i. g., were used. The contents of the autoclave were stirred for two days, and the contents were stratified forming an extract phase and a raffinate phase. The phases were separated while maintaining the autoclave under the $BF_3$ partial pressure of about 500 p. s. i. g. The raffinate phase and the extract phase were then worked up on the customary manner and their alkylbenzene contents determined. During the reaction approximately 90 mole percent conversion occurred. The composition of the extract phase and the raffinate phase are as follows:

EXTRACT

| | Percent |
|---|---|
| Benzene | 10 |
| Ethylbenzene | 2 |
| o-Xylene | 7 |
| m-Xylene | 30 |
| p-Xylene | 9 |
| $C_{10}$ aromatics | 42 |
|    1,3,5-ethylxylene | 99 |

RAFFINATE

| | Percent |
|---|---|
| Benzene | 15 |
| Ethylbenzene | 12 |
| o-Xylene | 19 |
| m-Xylene | 32 |
| p-Xylene | 18 |
| $C_{10}$ aromatics | 4 |
|    1,3,5-ethylxylene | Trace |

From above runs 21–23 it is evident that a $C_{10}$ aromatic fraction can be produced which contains a very high concentration of the synthetic 1,3,5-ethylxylene, which is a highly desirable compound for dehydrogenation to the corresponding styrene, and polymerization to improved plastics. The data indicate that temperatures of about 75 to 200° F., with reaction times of about 0.5 to 4 hours are generally satisfactory for producing a large amount of 1,3,5-ethylxylene. The $BF_3$ partial pressure should preferably be between 500 and 5000 p. s. i. g. In run 23 the separation of the extract phase from the raffinate phase enabled the recovery of an extract phase which consisted of 99% purity, 1,3,5-ethylxylene. This run illustrates the unique ability of our catalyst to function as a highly active catalyst and as a selective solvent to separate one type of polyalkylbenzene from another.

Thus having described our invention what is claimed is:

1. A process for the catalytic conversion of alkylbenzenes having between 1 and 4 carbon atoms inclusive in any one alkyl side chain, the sum of the carbon atoms in the total number of side chains being at least 2 carbon atoms per alkylbenzene molecule, which process comprises contacting said alkylbenzene with between about 1 and 10 volumes of difluorophosphoric acid per volume of alkylbenzene in the presence of a partial pressure of $BF_3$ of between about 100 and 5000 p. s. i. g. at a temperature between about 0° and 300° F. for a period of time between about 20 hours and 1 minute, the longer times corresponding to the lower temperatures, removing $BF_3$ from contact with the hydrocarbons and acid, separating an acid phase from a hydrocarbon phase, and recovering converted alkylbenzenes from said hydrocarbon phase.

2. The process of claim 1 wherein between about 3 and 10 volumes of difluorophosphoric acid are employed per volume of feed alkylbenzene.

3. The process of claim 1 wherein a raffinate phase is separated from an extract phase prior to removing $BF_3$.

4. The process of claim 1 wherein $BF_3$ is removed by vaporization.

5. The process of claim 1 wherein the reaction time is sufficient for the reaction mixture to reach substantially equilibrium conditions.

6. A process for the disproportionation of a monoalkylbenzene having between 2 and 4 carbon atoms in the alkyl side chain which process comprises contacting said monoalkylbenzene with between about 1 and 10 volumes of difluorophosphoric acid per volume of alkylbenzene in the presence of a partial pressure of $BF_3$ of between about 100 and 5000 p. s. i. g. at a temperature between about 0° and 200° F. for a period of time of between about 20 hours and 1 minute, the longer times corresponding to the lower temperatures, removing $BF_3$ from contact with the hydrocarbons and acid, separating an acid phase from a hydrocarbon phase, and recovering polyalkylbenzenes from said hydrocarbon phase.

7. A process for the disproportionation of ethylbenzene which comprises contacting ethylbenzene with between about 1 and 10 volumes of difluorophosphoric acid per volume of ethylbenzene in the presence of a partial pressure of $BF_3$ of between about 500 and 5000 p. s. i. g. at a temperature of between about 50° and 150° F. for a period of time between about 5 hours and 5 minutes, the longer times corresponding to the lower temperatures, removing $BF_3$ from contact with the hydrocarbons and acid, separating an acid phase from a hydrocarbon phase, and recovering converted ethylbenzenes from said hydrocarbon phase.

8. The process of claim 7 wherein triethylbenzene is formed in an amount larger than the diethylbenzenes.

9. The process of claim 7 wherein a raffinate phase is separated from an extract phase prior to removing $BF_3$.

10. A process for isomerizing a trialkylbenzene having between 1 and 4 carbon atoms, inclusive, per alkyl side chain, and being a trialkylbenzene other than one which contains alkyl substituents in the 1, 3 and 5 positions, which process comprises contacting the feed trialkylbenzene with between about 1 and 10 volumes of difluorophosphoric acid in the presence of a partial pressure of $BF_3$ of between about 100 and 5000 p. s. i. g. at a temperature between about 0° and 200° F. for a period of time between about 20 hours and 5 minutes, the longer times corresponding to the lower temperatures, separating a raffinate phase from an extract phase, removing $BF_3$ from contact with the extract phase and thereby forming a hydrocarbon phase and an acid phase, separating the hydrocarbon phase from the acid phase, and recovering trialkylbenzenes substituted in the 1, 3 and 5 positions from the hydrocarbon phase.

11. The process of claim 10 wherein the trialkylbenzene is trimethylbenzene, and wherein a partial pressure of $BF_3$ of between 500 and 5000 p. s. i. g., a temperature of between about 50° and 150° F., and a contact time of between about 1 and 20 hours is employed.

12. A process for the production of 1,3,5-ethylxylene which comprises contacting ethylbenzene and xylene with between about 1 and 10 volumes of difluorophosphoric acid per volume of alkylbenzene in the presence of a partial pressure of $BF_3$ of between about 100 and 5000 p. s. i. g. at a temperature between about 0° and 300° F. for a period of time between about 20 hours and 1 minute, the longer times corresponding to the lower temperatures, separating a raffinate phase from an extract phase, removing $BF_3$ from contact with the extract phase and thereby forming a hydrocarbon phase and an acid phase, separating the hydrocarbon phase from the acid phase, and recovering 1,3,5-ethylxylene from the hydrocarbon phase.

13. The process of claim 12 wherein a hydroformate fraction concentrated in aromatic hydrocarbons having 8 carbon atoms in their molecule is employed as the feed stock.

References Cited in the file of this patent

UNITED STATES PATENTS

| | | |
|---|---|---|
| 2,469,335 | Johnson et al. | May 3, 1949 |
| 2,521,444 | Brooke et al. | Sept. 5, 1950 |
| 2,564,072 | Lien et al. | Aug. 14, 1951 |
| 2,589,621 | Lien et al. | Mar. 18, 1952 |
| 2,727,078 | Shoremaker | Dec. 13, 1955 |